United States Patent
Chen et al.

(10) Patent No.: US 10,652,434 B2
(45) Date of Patent: May 12, 2020

(54) IMAGE OPTIMIZATION METHOD AND RELATED DEVICE

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Yunna Chen, Guangdong (CN); ShenSian Syu, Guangdong (CN); Jian He, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 160 days.

(21) Appl. No.: 15/970,498

(22) Filed: May 3, 2018

(65) Prior Publication Data
US 2019/0215419 A1    Jul. 11, 2019

Related U.S. Application Data

(63) Continuation of application No. PCT/CN2018/073287, filed on Jan. 18, 2018.

(30) Foreign Application Priority Data

Jan. 9, 2018   (CN) .......................... 2018 1 0020152

(51) Int. Cl.
*H04N 1/62* (2006.01)
*G06T 7/11* (2017.01)
(Continued)

(52) U.S. Cl.
CPC ......... *H04N 1/628* (2013.01); *G06K 9/00234* (2013.01); *G06K 9/4652* (2013.01);
(Continued)

(58) Field of Classification Search
CPC .. H04N 1/628; H04N 1/6027; G06K 9/00234; G06K 9/4652; G06T 7/11
See application file for complete search history.

(56) References Cited

U.S. PATENT DOCUMENTS

| | | | |
|---|---|---|---|
| 2008/0101697 A1* | 5/2008 | Cho | G06T 5/009 382/169 |
| 2017/0221186 A1 | 8/2017 | Glotzbach | |

FOREIGN PATENT DOCUMENTS

| | | |
|---|---|---|
| CN | 101169930 A | 4/2008 |
| CN | 101309426 A | 11/2008 |

(Continued)

*Primary Examiner* — Leon Flores
(74) *Attorney, Agent, or Firm* — Hemisphere Law, PLLC; Zhigang Ma

(57) ABSTRACT

The present application discloses an image optimization method and related device, The method includes: detecting an image and determining a skin color region and a non-skin color region of the image; and determining a number T of expansion regions according to the skin color region, and performing a saturation optimization process on the T expansion regions, wherein the non-skin color region includes the T expansion regions, the number T is a positive integer, a saturation of a first pixel in the expansion region after the saturation optimization process is a first saturation, a saturation of a second pixel in the expansion region after the saturation optimization process is a second saturation, the first saturation is greater than or equal to the second saturation if a distance of the first pixel from the skin color region is greater than a distance of the second pixel from the skin color region.

11 Claims, 4 Drawing Sheets

(51) Int. Cl.
*G06K 9/00* (2006.01)
*G06K 9/46* (2006.01)
*H04N 1/60* (2006.01)

(52) U.S. Cl.
CPC ............ *G06T 7/11* (2017.01); *H04N 1/6027* (2013.01); *G06T 2207/30201* (2013.01)

(56) References Cited

FOREIGN PATENT DOCUMENTS

| | | | |
|---|---|---|---|
| CN | 101706874 | A | 5/2010 |
| CN | 104767983 | A | 7/2015 |
| CN | 105469356 | A | 4/2016 |
| CN | 107507128 | A | 12/2017 |
| WO | 2015122102 | A1 | 8/2015 |

* cited by examiner

```
┌─────────────────────────────────────────────┐ ╱─101
│ detecting an image and determines a skin    │
│ color region and a non-skin color region    │
│ of the image                                │
└─────────────────────────────────────────────┘
                       │
                       ▼
┌─────────────────────────────────────────────┐ ╱─102
│ determining a number T of expansion regions │
│ according to the skin color region, and     │
│ performing a saturation optimization process│
│ on the T expansion regions, wherein the     │
│ non-skin color region includes the T        │
│ expansion regions, the number T is a        │
│ positive integer, a saturation of a first   │
│ pixel in the expansion region after the     │
│ saturation optimization process is a first  │
│ saturation, a saturation of a second pixel  │
│ in the expansion region after the saturation│
│ optimization process is a second saturation,│
│ the first saturation is greater than or     │
│ equal to the second saturation if a distance│
│ of the first pixel from the skin color      │
│ region is greater than a distance of the    │
│ second pixel from the skin color region     │
└─────────────────────────────────────────────┘
```

FIG. 1

IMAGE OPTIMIZATION METHOD AND RELATED DEVICE

RELATED APPLICATIONS

This application is a continuation application of PCT Patent Application No. PCT/CN2018/073287, filed Jan. 18, 2018, which claims the priority benefit of Chinese Patent Application No. CN 201810020152.6, filed Jan. 9, 2018, which is herein incorporated by reference in its entirety.

FIELD OF THE DISCLOSURE

This application relates to the field of electronic technology, and in particular, to an image optimization method and related device.

BACKGROUND

Nowadays, with the gradual improvement of people's aesthetic concepts, requirements to qualities of images are also getting higher and higher. Therefore, it is essential to optimize images. Image optimization including hue optimization, saturation optimization and brightness optimization, and the optimized image is more natural and beautiful feeling.

SUMMARY

The embodiments of the present application provide an image optimization method and related devices that can achieve a gradual increase of saturation of a transition region between a skin color region and a non-skin color region to further make the image enhancement effect smoother.

In the first aspect, an embodiment of the present invention provides an image optimization method, which includes: detecting an image and determining a skin color region and a non-skin color region of the image; and determining a number T of expansion regions according to the skin color region, and performing a saturation optimization process on the T expansion regions, wherein the non-skin color region includes the T expansion regions, the number T is a positive integer, a saturation of a first pixel in the expansion region after the saturation optimization process is a first saturation, a saturation of a second pixel in the expansion region after the saturation optimization process is a second saturation, the first saturation is greater than or equal to the second saturation if a distance of the first pixel from the skin color region is greater than a distance of the second pixel from the skin color region.

In the second aspect, an embodiment of the present invention provides an image optimization device, which includes: a detecting unit, configured to detect an image; a determining unit, configured to determine a skin color region and a non-skin color region of the image; and an optimization unit, configured to determine a number T of expansion regions according to the skin color region, and perform a saturation optimization process on the T expansion regions, wherein the non-skin color region includes the T expansion regions, the number T is a positive integer, a saturation of a first pixel in the expansion region after the saturation optimization process is a first saturation, a saturation of a second pixel in the expansion region after the saturation optimization process is a second saturation, the first saturation is greater than or equal to the second saturation if a distance of the first pixel from the skin color region is greater than a distance of the second pixel from the skin color region.

In the third aspect, an embodiment of the present invention provides an image optimization device, which includes one or more processors, one or more memories, one or more transceivers, and one or more programs that are stored in the memory and are configured to be executed by the one or more processors; wherein the program includes instructions for performing the steps of the method as described in the first aspect.

In the fourth aspect, an embodiment of the present invention provides a display panel, wherein when the display panel performs image optimization, the method according to claim 1 is applied to the image optimization.

In the fifth aspect, an embodiment of the present invention provides a computer-readable storage medium storing a computer program for electronic data interchange, wherein the computer program causes the computer to perform the method as described in the first aspect.

In the sixth aspect, an embodiment of the present invention provides a computer program product, which includes a non-transitory computer-readable storage medium storing a computer program operable to cause a computer to perform the method as described in the first aspect.

It can be seen that, in the present application, T expansion regions are determined according to the skin color region, and the saturation optimization process is performed on the T expansion regions. After the saturation optimization process, if the distance between the first pixel and the skin color region is greater than the distance between the second pixel and the skin color region, the saturation of the first pixel is greater than or equal to the saturation of the second pixel, and both the first pixel and the second pixel are pixels in the T expansion regions. This allows for a gradual increase in the saturation of the transitional regions between the skin color region and the non-skin color region, and thereby makes the image enhancement smoother.

These and other aspects of the present application will be more concise and understandable in the description of the following embodiments.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description merely show some embodiments of the present application. For those of ordinary skill in the art, other drawings may be obtained based on these drawings without any creative work.

FIG. 1 is a schematic flowchart of an image optimization method according to an embodiment of the present application.

DETAILED DESCRIPTION OF PREFERRED EMBODIMENTS

Figure 2:
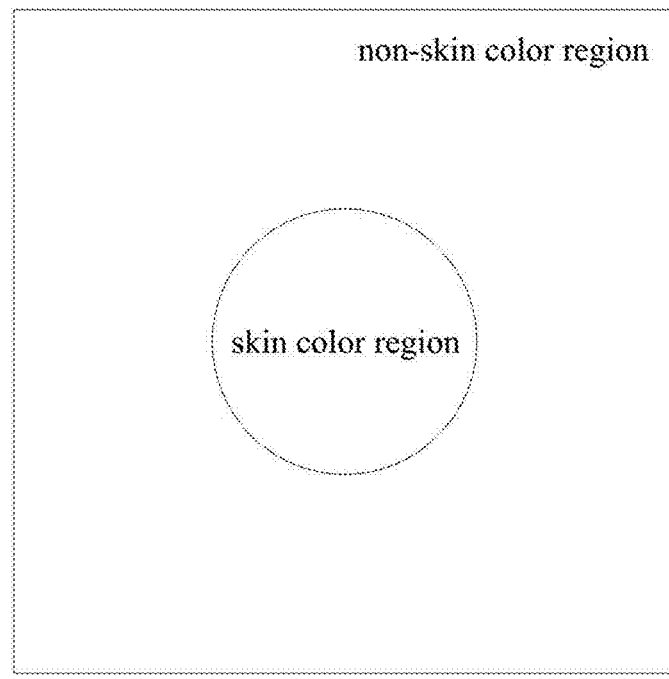
FIG. 2 is a schematic regional diagram of an image provided according to an embodiment of the present application.

In order to make those skilled in the art better understand the solutions of the present application, the technical solutions of the embodiments of the present application are clearly and completely described in the following with reference to the accompanying drawings in the embodiments of the present application. Apparently, the described embodiments are merely a part of this application, but not all embodiments are described. All other embodiments obtained by persons of ordinary skills in the art based on the embodiments of the present application without creative efforts shall fall in the protection scope of this application.

The following is detailed description.

The terms "first", "second", "third" and "fourth", etc. in the description, claims of this application, and the drawings are used to distinguish different objects, rather than to describe a specific order. Furthermore, the terms "include" and "have" and any variations thereof are intended to cover a non-exclusive inclusion. For example, a process, method, system, product, or device that incorporates a series of steps or units is not limited to the steps or units listed but may optionally further include steps or units not listed or may optionally further include other steps or units inherent to these processes, methods, products or devices.

Reference herein to "an embodiment" means a particular feature, structure, or characteristic described in connection with the embodiment may be included in at least one embodiment of the present application. The appearances of the phrase in various places in the specification are not necessarily all referring to the same embodiment, nor are separate or alternative embodiments mutually exclusive of other embodiments. As one of ordinary skill in the art explicitly and implicitly appreciates, the embodiments described herein may be combined with other embodiments.

Hereinafter, some terms of the present application will be explained for understanding by those skilled in the art.

1) An electronic device may include various handheld devices having wireless communication capabilities, automotive devices, wearable devices (eg, smart watches, smart bracelets, pedometers, etc.), computing devices or other processing devices connected to wireless modems, and various forms of user equipment (UE), mobile station (MS), terminal device, and the like. For the convenience of description, the devices mentioned above are collectively referred to as an electronic device, and the above electronic device has an image optimization function.

2) Saturation, also called color purity, refers to the vividness of color. The greater the saturation, the greater the color component; the smaller the saturation, the greater the achromatic components.

Please refer to FIG. 1. FIG. 1 is a schematic flowchart of an image optimization method provided by an embodiment of the present application. The execution subject for executing the image optimization method may be an electronic device or an image optimization device including a display panel. The image optimization device is described in detail below. The method includes the following.

Step 101: the image optimization device detects an image and determines a skin color region and a non-skin color region of the image.

The image before the saturation optimization process consists of a skin color region and a non-skin color region, wherein the skin color region can be one or more. As shown in FIG. 2, the image consists of a skin color region and a non-skin color region.

Wherein, the skin color region refers to the region with skin color in the image, and the non-skin color region is the region of the image other than the skin color region.

Further, specific execution that the image optimization device detects the image and determines the skin color region and the non-skin color region of the image is as follows. The image optimization device uses a skin color detection algorithm to detect the image to obtain a binary mask image. The mage optimization device via the binary mask image defines the region consisting of pixels whose gray level value is 255 as the skin color region, and the region consisting of pixels whose gray level value is 0 as the non-skin color region. Wherein, the skin color detection algorithm includes a simple threshold color recognition algorithm based on RGB color space, a simple threshold color recognition algorithm based on RG color space, and a simple threshold color recognition algorithm based on Ycbcr color space.

Step 102: the image optimization device determines a number T of expansion regions according to the skin color region, and performs a saturation optimization process on the T expansion regions, wherein the non-skin color region includes the T expansion regions, the number T is a positive integer, a saturation of a first pixel in the expansion region after the saturation optimization process is a first saturation, a saturation of a second pixel in the expansion region after the saturation optimization process is a second saturation, the first saturation is greater than or equal to the second saturation if a distance of the first pixel from the skin color region is greater than a distance of the second pixel from the skin color region.

Wherein, the expansion region refers to the additional region where a region after the expansion (the post-expansion region) is compared with the region before the expansion (the pre-expansion region).

Specifically, the image optimization device determines T expansion regions according to the skin color region. The specific implementation manner is as follows. The image optimization device performs a first expiation operation on the skin color region to obtain a first expansion region, and performs a second expansion operation on the region operated by the first expansion operation to obtain a second expansion region, and the expansion operation is repeated until the Tth expansion operation is performed on the region after the (T−1)th expansion operation to obtain the Tth expansion region.

Specifically, the image optimization device performs T times of saturation optimization to T expansion regions; or the image optimization device performs one time saturation optimization on the T expansion regions after determining T expansion zones.

Wherein, the distance between the pixel in the expansion region and the skin color region refers to the closest distance between the pixel in the expansion region and an edge of the skin color region or the distance between the pixel in the expansion region and the center of the skin color region.

It can be seen that, in the present application, T expansion regions are determined according to the skin color region, and the saturation optimization process is performed on the T expansion regions. After the saturation optimization process, if the distance between the first pixel and the skin color region is greater than the distance between the second pixel and the skin color region, the saturation of the first pixel is greater than or equal to the saturation of the second pixel, and both the first pixel and the second pixel are pixels in the T expansion regions. This allows for a gradual increase in the saturation of the transitional regions between the skin color region and the non-skin color region, and thereby makes the image enhancement smoother.

In an embodiment of the present invention, the image optimization device "determines a number T of expansion regions according to the skin color region and performs a saturation optimization process on the T expansion regions", which includes: S1: the image optimization device acquires a structure element and a total number T of times of expansion; S2: the image optimization device determines T weights according to the total number T of times of expansion, wherein the T weights correspond to the T times of expansion operations one by one, and the T weights increase as the number of times of expansion increases; S3: the image optimization device expands a pre-expansion region according to the structural element to obtain a post-expansion region; wherein the post-expansion region consists of the pre-expansion region and the expansion region; in the first expansion operation, the pre-expansion region is the skin color region; and the post-expansion region serves as the pre-expansion region in the next expansion operation; S4: the image optimization device adjusts the saturation of the expansion region to a saturation corresponding to a weight $r_i$, wherein the weight $r_i$ is the weight corresponding to the expansion operation of this time, and the weight $r_i$ is in direct proportion to the saturation corresponding to the weight $r_i$; and S5: the image optimization device cycles the steps S3-S4 until the number of times of expansion is T.

Wherein, the structural element refers to a basic unit of the image expansion or erosion operation in the image morphology. Common structural elements are disc-shaped, square, diamond, hexagonal, line-shaped and so on.

Wherein, T weights can satisfy the first order function whose slope is greater than zero, and also satisfy the non-linear transformation function which tends to increase with the increase of times of expansion times.

Figure 3:
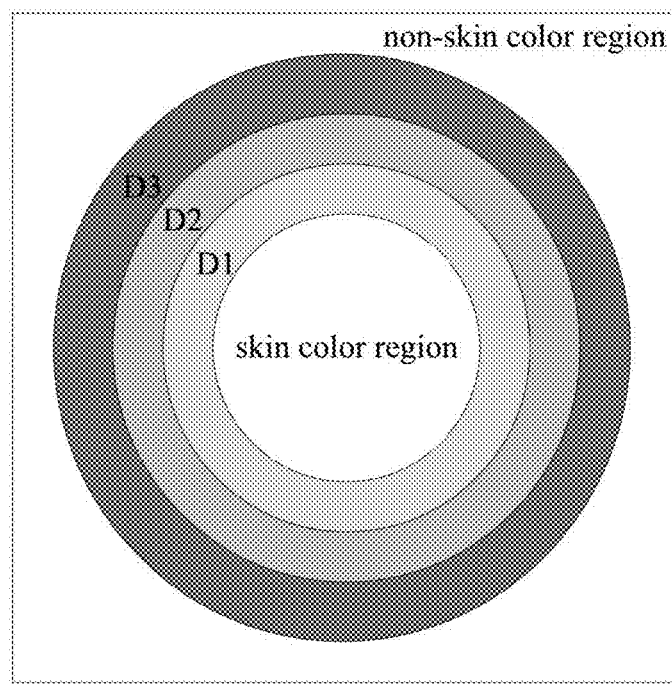
FIG. 3 is a schematic diagram of a gradual increase of saturation of an image according to an embodiment of the present application.
Figure 4:
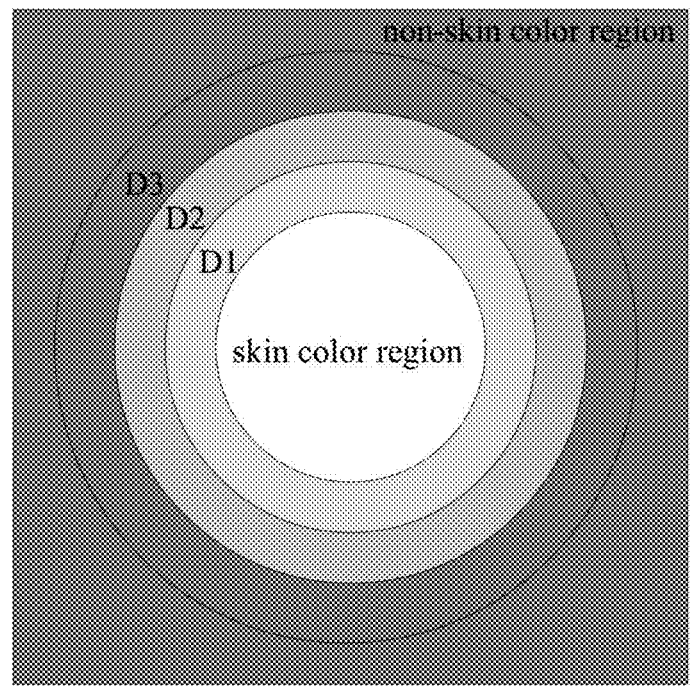
FIG. 4 is a schematic diagram of a gradient enhancement of saturation of another image according to an embodiment of the present application.

For example, as shown in FIG. 3, the image optimization device obtains a structural element (a disc with a certain radius) and the total number of expansion times T=3. The image optimization device determines the skin color region, performs a first expansion operation on the skin color region by using the structural element to obtain a first post-expansion region including the skin color region and the first expansion region D1, and performs the saturation enhancement of the first weight on the first expansion region D1. The image optimization device performs a second expansion operation on the first post-expansion region by using the structural element to obtain a second post-expansion region, wherein the second post-expansion region includes the first post-expansion region and a second expansion region D2; and performs the saturation enhancement of the second weight on the second expansion region D2, wherein the second weight is greater than the first weight. The image optimization device performs a third expansion operation on the second post-expansion region by using the structural element to obtain a third post-expansion region, wherein the third post-expansion region includes a second post-expansion region and a third expansion region D3; and performs the saturation enhancement of the third weight on the third expansion region D3, wherein the third weight is greater than the second weight, and the weight is proportional to the saturation corresponding to the weight.

In an embodiment of the present invention, the image optimization device "determines a number T of expansion regions according to the skin color region and performs a saturation optimization process on the T expansion regions", which includes: S1: acquire a structure element and a total number T of times of expansion; S2: determine T weights according to the total number T of times of expansion, wherein the T weights correspond to the T times of expansion operations one by one, and the T weights increase as the number of times of expansion increases; S3: expand a pre-expansion region according to the structural element to obtain a post-expansion region; wherein the post-expansion region consists of the pre-expansion region and the expansion region; in the first expansion operation, the pre-expansion region is the skin color region; and the post-expansion region serves as the pre-expansion region in the next expansion operation; S4: adjust the saturation of the expansion region to a saturation corresponding to a weight $r_i$, wherein the weight $r_i$ is the weight corresponding to the expansion operation of this time, and the weight $r_i$ is in direct proportion to the saturation corresponding to the weight $r_i$; and S5: cycle the steps S3-S4 until the number of times of expansion is T. Wherein T weights can satisfy the first order function whose slope is greater than zero, and also satisfy the nonlinear transformation function that increases with the increase of times of expansion.

For example, as shown in FIG. 3, the image optimization device obtains a structural element (a disc with a certain radius) and the total number of expansion times T=3. The image optimization device determines the skin color region, performs a first expansion operation on the skin color region by using the structural element to obtain a first post-expansion region including the skin color region and the first expansion region D1, and performs the saturation enhancement of the first weight on regions other than the skin color region. The image optimization device performs a second expansion operation on the first post-expansion region by using the structural element to obtain a second post-expansion region, wherein the second post-expansion region includes the first post-expansion region and a second expansion region D2; and performs the saturation enhancement of the second weight on regions other than the first post-expansion region, wherein the second weight is greater than the first weight. The image optimization device performs a third expansion operation on the second post-expansion region by using the structural element to obtain a third post-expansion region, wherein the third post-expansion region includes a second post-expansion region and a third expansion region D3; and performs the saturation enhancement of the third weight on regions other than the second post-expansion region, wherein the third weight is greater than the second weight, and the weight is proportional to the saturation corresponding to the weight.

In an embodiment of the present invention, the image optimization device ""adjusts the saturation of the expansion region to a saturation corresponding to a weight $r_i$, wherein the weight $r_i$ is the weight corresponding to the expansion operation of this time, and the weight $r_i$ is in direct proportion to the saturation corresponding to the weight $r_i$", which includes the following. The image optimization device obtains a number of expansion corresponding to the expansion region; the image optimization device determines a weight $r_i$ corresponding to the number of expansion according to a weight formula; the image optimization device determines a saturation corresponding to the weight $r_i$ according to the weight $r_i$ and a saturation enhancement curve formula; and the image optimization device adjusts the saturation of the expansion to the saturation corresponding to the weight $r_i$, wherein the weight formula is:

$$r_i = r_0 + \frac{(r_T - r_0)}{T} * i$$

Wherein the $r_i$ is the weight corresponding to the number of times of expansions; $r_0=1$, indicating that the skin color region retains the original color; $r_T=a$ (a>1), indicating that the total expansion number T corresponds to the weight a, T is the total number of expansions and i is the number of expansion (i=1, 2, . . . , T).

Wherein the saturation enhancement curve formula is:

$$f(C)=C^{r_i}$$

Wherein f(C) is the saturation enhancement function, C is the saturation, and $r_i$ is the weight corresponding to the number of expansions.

For example, assuming that the total number of times of expansion T=3, $r_T$=1.1, and the saturation C=50, the image optimization device obtains the number of expansion corresponding to the expansion region D3 as 3, and determines the weight r is 1.1 corresponding to the number of expansions (3 times) according to the weight formula $r_i$=1+0.1÷3× i; and according to the weight r=1.1 and the saturation enhancement curve formula $f(C)=50^{r_i}$, determines the weight $r_i$=1.1 corresponds to a saturation of 74, and the saturation of the expansion region D3 is adjusted to 74.

In an embodiment of the present invention, when the first pixel and the second pixel are in different expansion regions, the first saturation is greater than the second saturation; and when the first pixel and the second pixel are in the same expansion region, the first saturation is equal to the second saturation.

For example, as shown in FIG. 3, when the total number T of times of expansion is 3 and the distance between the first pixel and the skin color region is greater than the distance between the second pixel and the skin color region, if the first pixel and the second pixel are in the same expansion region (one of the expansion regions D1, D2 or D3), the first saturation is equal to the second saturation; and if the first pixel and the second pixel are in different expansion regions (for example, the first pixel is in the expansion region D2 and the second pixel is in the expansion region D1, or the first pixel is in the expansion region D3 and the second pixel is in the expansion region D2), the first saturation is greater than the second saturation.

In the present application, it can be seen that the saturation of the pixel in the expansion region D2 is greater than the saturation of the pixel in the expansion region D1 and the saturation of the pixel in the expansion region D3 is greater than the saturation of the pixel in the expansion region D2. The transition from the skin color region to the middle of the non-skin color region is gradually enhanced in gradation of saturation, and thereby further enhancing the image enhancement effect. In the meantime, this can not only solve the problem of using the same saturation for the skin color region and the non-skin color region of the image resulting in enhancement effect of the enhancement method is too obvious and unnatural, but also to a certain extent, the discontinuity produced by using different saturation enhancement methods for the skin color region and the non-skin color region of the image is solved.

In an embodiment of the present invention, the method further includes: the image optimization device performs the saturation optimization process on a target region, wherein a saturation of the target region after the saturation optimization process is greater than or equal to the saturation of the expansion region after the saturation optimization process, and the target region is a region of the image other than the regions after the T times of expansion.

Wherein, the saturation of the expansion region after the saturation optimization processing refers to the maximum saturation of T expansion regions after the saturation optimization processing.

Wherein, the difference between the saturation of the target region after the saturation optimization processing and the maximum saturation of the expansion region after the saturation optimization processing is less than or equal to a set threshold.

Wherein, for example, the set threshold may be 0, 1, 2, 3, 4, 5 or other values.

Figure 5:
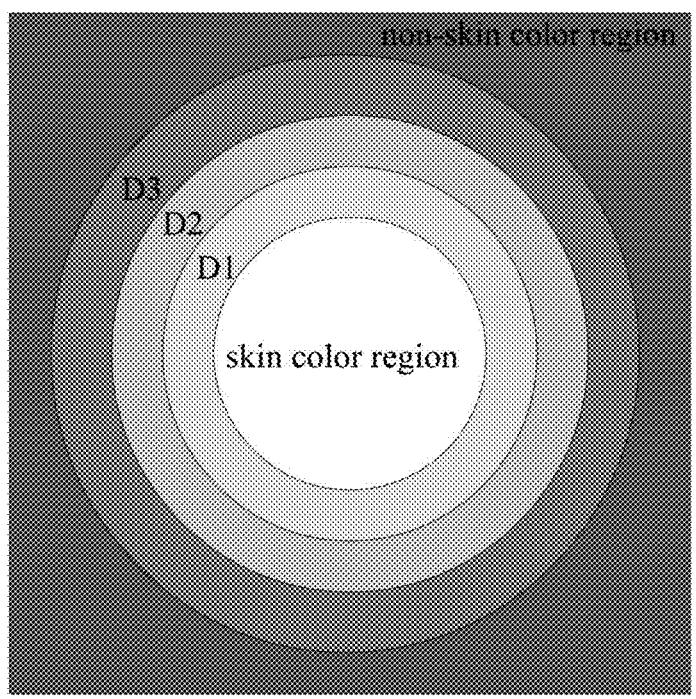
FIG. 5 is a schematic diagram of a gradient enhancement of saturation of another image provided in this embodiment of the present application.

For example, as shown in FIG. 5, the threshold value is set as 5, and the target region is a region other than the skin color region, the expansion region D1, the expansion region D2 and the expansion region D3 in the image, and the saturation of the expansion region D3 in the image is 74, so the target region of the saturation is adjusted to 79.

It can be seen that in the present application, the saturation of the target region is adjusted to be greater than or equal to the maximum saturation of the T expansion regions, and the difference between the saturation of the target region and the maximum saturation of the T expansion regions is a small value, So that the saturation of the expansion region corresponding to the total number of expansions T can be substantially the same as the saturation of the target region, thereby further smoothing the image enhancement effect.

The above describes in detail of the method of the embodiment of the present application, and the device of the embodiment of the present disclosure is provided below.

Figure 6:
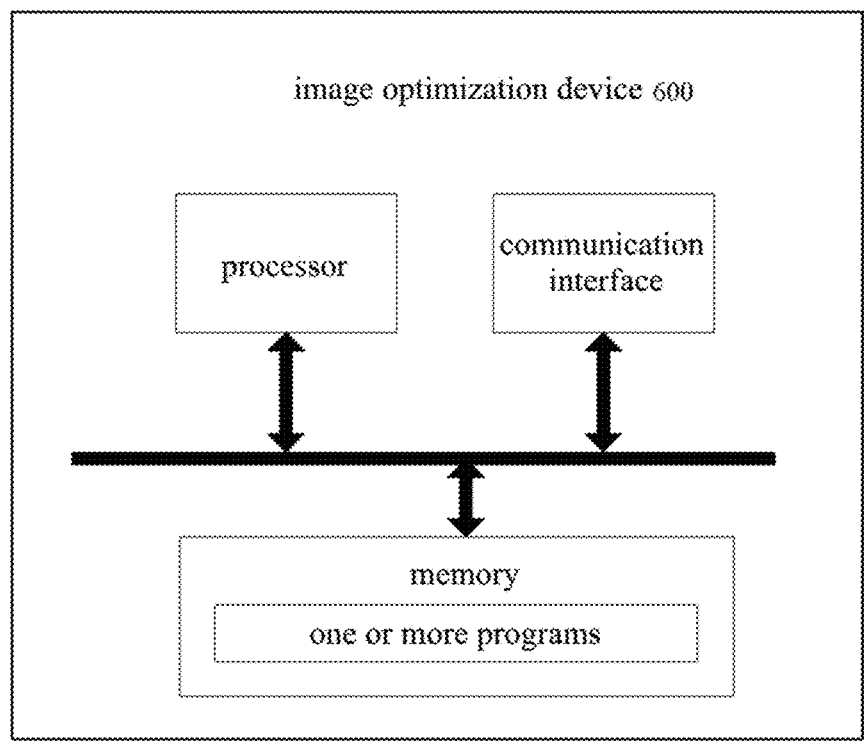
FIG. 6 is a schematic structural diagram of an image optimization device according to an embodiment of the present application.

Please refer to FIG. 6. FIG. 6 is an image optimization device 600 provided by an embodiment of the present application, including: at least one processor, at least one memory, and at least one communication interface; and one or more programs.

The one or more programs being stored in the memory and configured to be executed by the processor, wherein the program includes instructions for performing the steps of: detecting an image and determining a skin color region and a non-skin color region of the image; and determining a number T of expansion regions according to the skin color region, and performing a saturation optimization process on the T expansion regions, wherein the non-skin color region includes the T expansion regions, the number T is a positive integer, a saturation of a first pixel in the expansion region after the saturation optimization process is a first saturation, a saturation of a second pixel in the expansion region after the saturation optimization process is a second saturation, the first saturation is greater than or equal to the second saturation if a distance of the first pixel from the skin color region is greater than a distance of the second pixel from the skin color region.

In an embodiment of the present invention, the image optimization device "determines a number T of expansion regions according to the skin color region and performs a saturation optimization process on the T expansion regions", in which the program includes instructions specifically for performing the steps of: S1: acquiring a structure element and a total number T of times of expansion; S2: determining T weights according to the total number T of times of expansion, wherein the T weights correspond to the T times of expansion operations one by one, and the T weights increase as the number of times of expansion increases; S3: expanding a pre-expansion region according to the structural element to obtain a post-expansion region; wherein the post-expansion region consists of the pre-expansion region and the expansion region; in the first expansion operation, the pre-expansion region is the skin color region; and the post-expansion region serves as the pre-expansion region in the next expansion operation; S4: adjusting the saturation of the expansion region to a saturation corresponding to a weight $r_i$; wherein the weight $r_i$ is the weight corresponding to the expansion operation of this time, and the weight $r_i$ is in direct proportion to the saturation corresponding to the weight $r_i$; and S5: cycling the steps S3-S4 until the number of times of expansion is T.

In an embodiment of the present invention, the image optimization device "adjusts the saturation of the expansion region to a saturation corresponding to a weight $r_i$", in which the program includes instructions specifically for performing the steps of: obtaining a number of expansion corresponding to the expansion region; determining a weight $r_i$ corresponding to the number of expansion according to a weight formula; determining a saturation corresponding to the weight $r_i$ according to the weight $r_i$ and a saturation enhancement curve formula; and adjusting the saturation of the expansion to the saturation corresponding to the weight $r_i$.

In an embodiment of the present invention, the program further includes instructions for performing the steps of: when the first pixel and the second pixel are in different expansion regions, the first saturation is greater than the second saturation; and when the first pixel and the second pixel are in the same expansion region, the first saturation is equal to the second saturation.

In an embodiment of the present invention, the program further includes instructions for performing the steps of: performing the saturation optimization process on a target region, wherein a saturation of the target region after the saturation optimization process is greater than or equal to the saturation of the expansion region after the saturation optimization process, and the target region is a region of the image other than the regions after the T times of expansion.

It should be noted that, for the specific implementation manner of the content in this embodiment, reference may be made to the foregoing method, and no further description is provided herein.

The above mainly introduces the solution of the embodiment of the present application from the perspective of the method-side execution process. It is understood that the image optimization device includes hardware components and/or software modules corresponding to the respective functions in order to realize the above functions. Those skilled in the art should readily recognize that, in combination with the example units and algorithm steps described in the embodiments disclosed herein, the present application can be implemented in hardware or a combination of hardware and computer software. Whether a function is implemented by way of hardware or computer software-driven hardware depends on the particular application and design constraints of the technical solution. A person skilled in the art may use different methods to implement the described functions for each particular application, but such implementation should not be considered as beyond the scope of the present application.

The embodiments of the present application may divide the functional units of the image optimization device according to the foregoing method embodiments. For example, each functional unit may be divided according to each function, or two or more functional units may be divided. The functions are integrated into one processing unit. The above-mentioned integrated unit can be implemented in the form of hardware or in the form of software functional unit. It should be noted that the division of units in the embodiment of the present application is schematic, and is merely a logical function division, and there may be other division manners in actual implementation.

Figure 7:
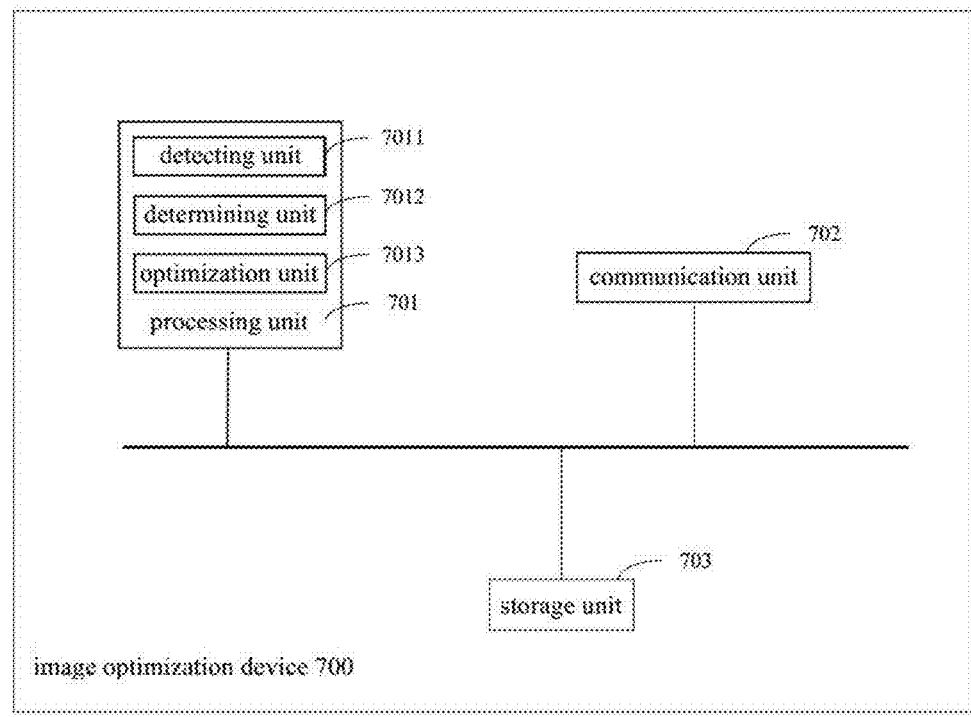
FIG. 7 is a schematic structural diagram of another image optimization device according to an embodiment of the present application.

In the case of an integrated unit, FIG. 7 shows a possible functional unit block diagram of the image optimization device involved in the above embodiments. The image optimization device 700 includes a processing unit 701, a communication unit 702, and a storage unit 703. The processing unit 701 includes a detecting unit 7011, a determining unit 7012, and an optimization unit 7013. The storage unit 703 is for storing program codes and data of the image optimization device. The communication unit 702 is for supporting the image optimization device to communicate with other devices. Some of the above units (the detecting unit 7011, the determining unit 7012, and the optimization unit 7013) are used to perform the related steps of the above method, wherein: the detecting unit 7011 is configured to detect the image; the determining unit 7012 is configured to determine a skin color region and a non-skin color region of the image; and the optimization unit 7013 is configured to determine a number T of expansion regions according to the skin color region, and perform a saturation optimization process on the T expansion regions, wherein the non-skin color region includes the T expansion regions, the number T is a positive integer, a saturation of a first pixel in the expansion region after the saturation optimization process is a first saturation, a saturation of a second pixel in the expansion region after the saturation optimization process is a second saturation, the first saturation is greater than or equal to the second saturation if a distance of the first pixel from the skin color region is greater than a distance of the second pixel from the skin color region.

In an embodiment of the present invention, the image optimization device is configured to "determine a number T of expansion regions according to the skin color region, and perform a saturation optimization process on the T expansion regions", in which the optimization unit 7013 is specifically configured to: S1: acquire a structure element and a total number T of times of expansion; S2: determine T weights according to the total number T of times of expansion, wherein the T weights correspond to the T times of expansion operations one by one, and the T weights increase as the number of times of expansion increases; S3: expand a pre-expansion region according to the structural element to obtain a post-expansion region; wherein the post-expansion region consists of the pre-expansion region and the expansion region; in the first expansion operation, the pre-expansion region is the skin color region; and the post-expansion region serves as the pre-expansion region in the next expansion operation; S4: adjust the saturation of the expansion region to a saturation corresponding to a weight $r_i$, wherein the weight $r_i$ is the weight corresponding to the expansion operation of this time, and the weight $r_i$ is in direct proportion to the saturation corresponding to the weight $r_i$; and S5: cycle the steps S3-S4 until the number of times of expansion is T.

In an embodiment of the present invention, the image optimization device is to adjust the saturation of the expansion region to a saturation corresponding to a weight $r_i$, wherein the determining unit further includes: a first determining unit, configured to obtain a number of expansion corresponding to the expansion region; a second determining unit, configured to determine a weight $r_i$ corresponding to the number of expansion according to a weight formula; a third determining unit, configured to determine a saturation corresponding to the weight $r_i$ according to the weight $r_i$ and a saturation enhancement curve formula; and an adjusting unit, to adjust the saturation of the expansion to the saturation corresponding to the weight $r_i$.

In an embodiment of the present invention, when the first pixel and the second pixel are in different expansion regions, the first saturation is greater than the second saturation; and when the first pixel and the second pixel are in the same expansion region, the first saturation is equal to the second saturation.

In an embodiment of the present invention, the optimization unit 7013 is further configured to perform the saturation optimization process on a target region, wherein a saturation of the target region after the saturation optimization process is greater than or equal to the saturation of the expansion region after the saturation optimization process, and the target region is a region of the image other than the regions after the T times of expansion.

Wherein, the processing unit 701 may be a processor or a controller (e.g. may be a central processing unit (CPU), a general purpose processor, a digital signal processor (DSP), an application specific integrated circuit (ASIC), field programmable gate array (FPGA), or other programmable logic device, transistor logic, hardware components, or any combination thereof, which may implement or perform various functions described in conjunction with the exemplary various exemplary logic blocks, modules, and circuits in the present application. The processors may also be combinations that implement computing functions, for example, including one or more combinations of microprocessors, combinations of DSPs and microprocessors, etc.). The storage unit 703 may be a memory, and the communication unit 702 may be a transceiver, a transceiver circuit, a radio frequency chip, a communication interface, and the like.

An embodiment of the present invention further provides a display panel, wherein when the image is optimized on the display panel, the display panel is applicable to some or all of the steps of any one of the methods described in the above method embodiments.

An embodiment of the invention also provides a computer storage medium, wherein the computer storage medium stores a computer program for electronic data exchange, and the computer program causes the computer to execute some or all steps of any one of the methods described in the above method embodiments. The computer includes the image optimization device.

An embodiment of the present invention also provides a computer program product, which includes a non-transitory computer-readable storage medium storing a computer program operable to cause a computer to perform all steps of any one of the methods described in the above method embodiments. The computer program product may be a software installation package, which includes an image optimization device.

It should be noted that, for the foregoing method embodiments, for simplicity of description, all of them are described as a series of combinations of actions. However, those skilled in the art should understand that the present application is not limited to the described sequence of actions, because certain steps may be performed in other sequences or concurrently according to the application. Secondly, those skilled in the art should also know that the embodiments described in the specification belong to the preferred embodiments, and the actions and modules involved are not necessarily required in the present application.

In the foregoing embodiments, the description of each embodiment has its own emphasis. For the parts that are not described in detail in one embodiment, reference may be made to related descriptions in other embodiments.

In the several embodiments provided in the present application, it should be understood that the disclosed devices may be implemented in other manners. For example, the device embodiments described above are merely exemplary. For example, the unit division is merely logical function division and may be other division in actual implementation. For example, a plurality of units or components may be combined or may be Integrate into another system, or some features may be ignored or not executed. In addition, the shown or discussed mutual coupling or direct coupling or communication connection may be indirect coupling or communication connection through some interfaces, devices or units, and may be in electrical or other forms.

The units described as separate components may or may not be physically separated. The components displayed as units may or may not be physical units, that is, they may be located in one place or may also be distributed to multiple network units. Some or all of the units may be selected according to actual needs to achieve the objectives of the solution in this embodiment.

In addition, each of the functional units in the embodiments of the present application may be integrated in one processing unit, or each of the units may exist alone physically, or two or more units may be integrated in one unit. The above-mentioned integrated unit can be implemented in the form of hardware or in the form of software functional unit.

The integrated unit, if implemented in the form of a software functional unit and sold or used as an independent product, may be stored in a computer-readable memory. Based on this understanding, the technical solutions of the present application essentially, or the part contributing to the prior art, or all or part of the technical solutions may be implemented in the form of a software product stored in a memory, include several instructions for enabling one computer device (which may be a personal computer, a server or a network device) to perform all or part of the steps of the method according to the embodiments of the present application. The foregoing memory includes various media capable of storing program codes, such as a USB flash disk, a read-only memory (ROM), a random access memory (RAM), a removable hard disk, a magnetic disk, or an optical disk.

A person having ordinary skills in the art should understand that all or part of the steps in the methods in the foregoing embodiments may be implemented by a program instructing relevant hardware. The program may be stored in a computer-readable memory, and the memory may include a flash drive, read-only memory (English: Read-Only Memory, ROM for short), random access memory (English: Random Access Memory, RAM for short), a magnetic disk or an optical disk.

The embodiments of the present invention have been described in detail in the foregoing. Specific examples are used herein to describe the principles and implementation manners of the present application. The description of the foregoing embodiments is merely intended to help understand the method of the present application and meanwhile, to those skilled in the art, based on the idea of the present application, changes may be made in the specific implementation manners and application scopes. In conclusion, the contents of this description should not be construed as limiting the present application.

What is claimed is:

1. An image optimization method, comprising:
   detecting an image and determining a skin color region and a non-skin color region of the image; and
   determining a number T of expansion regions according to the skin color region, and performing a saturation optimization process on the T expansion regions, wherein the non-skin color region includes the T expansion regions, the number T is a positive integer, a saturation of a first pixel in the expansion region after the saturation optimization process is a first saturation, a saturation of a second pixel in the expansion region after the saturation optimization process is a second saturation, the first saturation is greater than or equal to the second saturation when a distance of the first pixel from the skin color region is greater than a distance of the second pixel from the skin color region,
   wherein determining a number T of expansion regions according to the skin color region and performing a saturation optimization process on the T expansion regions comprises:
   S1: acquiring a structure element and a total number T of times of expansion;
   S2: determining T weights according to the total number T of times of expansion, wherein the T weights correspond to the T times of expansion operations one by one, and the T weights increase as the number of times of expansion increases;
   S3: expanding a pre-expansion region according to the structural element to obtain a post-expansion region; wherein the post-expansion region consists of the pre-expansion region and the expansion region; in the first expansion operation, the pre-expansion region is the skin color region; and the post-expansion region serves as the pre-expansion region in the next expansion operation;
   S4: adjusting the saturation of the expansion region to a saturation corresponding to a weight $r_i$, wherein the weight $r_i$ is the weight corresponding to this expansion operation, and the weight $r_i$ is in direct proportion to the saturation corresponding to the weight r; and
   S5: cycling the steps S3-S4 until the number of times of expansion is T.

2. The method according to claim 1, wherein "adjusting the saturation of the expansion region to a saturation corresponding to a weight $r_i$" comprises:
   obtaining a number of expansion corresponding to the expansion region;
   determining a weight r corresponding to the number of expansion according to a weight formula;
   determining a saturation corresponding to the weight $r_i$ according to the weight $r_i$ and a saturation enhancement curve formula; and
   adjusting the saturation of the expansion to the saturation corresponding to the weight $r_i$.

3. The method according to claim 2, wherein when the first pixel and the second pixel are in different expansion regions, the first saturation is greater than the second saturation; and when the first pixel and the second pixel are in the same expansion region, the first saturation is equal to the second saturation.

4. The method according to claim 2, further comprising: performing the saturation optimization process on a target region, wherein, after the saturation optimization process, a saturation of the target region is greater than or equal to the saturation of the expansion region, and the target region is a region of the image other than the regions after the T times of expansion.

5. The method according to claim 1, wherein when the first pixel and the second pixel are in different expansion regions, the first saturation is greater than the second saturation; and when the first pixel and the second pixel are in the same expansion region, the first saturation is equal to the second saturation.

6. The method according to claim 1, further comprising: performing the saturation optimization process on a target region, wherein, after the saturation optimization process, a saturation of the target region is greater than or equal to the saturation of the expansion region, and the target region is a region of the image other than the regions after the T times of expansion.

7. A display panel, wherein when the display panel performs image optimization, the method according to claim 1 is applied to the image optimization.

8. An image optimization device, comprising:
   a detecting unit, configured to detect an image;
   a determining unit, configured to determine a skin color region and a non-skin color region of the image; and
   an optimization unit, configured to determine a number T of expansion regions according to the skin color region, and perform a saturation optimization process on the T expansion regions, wherein the non-skin color region includes the T expansion regions, the number T is a positive integer, a saturation of a first pixel in the expansion region after the saturation optimization process is a first saturation, a saturation of a second pixel in the expansion region after the saturation optimization process is a second saturation, the first saturation is greater than or equal to the second saturation when a distance of the first pixel from the skin color region is greater than a distance of the second pixel from the skin color region, wherein in determine a number T of expansion regions according to the skin color region and perform a saturation optimization process on the T expansion regions, the optimization unit is specifically configured to:
   S1: acquire a structure element and a total number T of times of expansion;
   S2: determine T weights according to the total number T of times of expansion, wherein the T weights correspond to the T times of expansion operations one by one, and the T weights increase as the number of times of expansion increases;
   S3: expand a pre-expansion region according to the structural element to obtain a post-expansion region; wherein the post-expansion region consists of the pre-expansion region and the expansion region; in the first expansion operation, the pre-expansion region is the skin color region; and the post-expansion region serves as the pre-expansion region in the next expansion operation;
   S4: adjust the saturation of the expansion region to a saturation corresponding to a weight $r_i$, wherein the weight $r_i$ is the weight corresponding to the expansion operation of this time, and the weight $r_i$ is in direct proportion to the saturation corresponding to the weight $r_i$; and S5: cycle the steps S3-S4 until the number of times of expansion is T.

9. The device according to claim 8, wherein in "adjust the saturation of the expansion region to a saturation corresponding to a weight $r_i$", the determining unit further comprises:
- a first determining unit, configured to obtain a number of expansion corresponding to the expansion region;
- a second determining unit, configured to determine a weight $r_i$ corresponding to the number of expansion according to a weight formula;
- a third determining unit, configured to determine a saturation corresponding to the weight $r_i$ according to the weight $r_i$ and a saturation enhancement curve formula; and
- an adjusting unit, configured to adjust the saturation of the expansion to the saturation corresponding to the weight $r_i$.

10. The device according to claim 9, wherein when the first pixel and the second pixel are in different expansion regions, the first saturation is greater than the second saturation; and when the first pixel and the second pixel are in the same expansion region, the first saturation is equal to the second saturation.

11. The device according to claim 8, wherein when the first pixel and the second pixel are in different expansion regions, the first saturation is greater than the second saturation; and when the first pixel and the second pixel are in the same expansion region, the first saturation is equal to the second saturation.

* * * * *